United States Patent [19]

Provence

[11] Patent Number: 5,501,329
[45] Date of Patent: Mar. 26, 1996

[54] TELEPHONE HANDSET COVER

[76] Inventor: Daniel J. Provence, 160 Mohawk Dr., Cranford, N.J. 07016

[21] Appl. No.: 417,196

[22] Filed: Apr. 5, 1995

[51] Int. Cl.⁶ .................................................. B65D 85/00
[52] U.S. Cl. ......................... 206/320; 206/223; 150/165; 379/451
[58] Field of Search ................................. 206/525, 526, 206/320, 216, 223; 379/451, 452, 439, 437; 150/154, 165; 220/4.24, 691

[56] References Cited

U.S. PATENT DOCUMENTS 3,169,171  2/1965  Wachs et al. ........................... 379/451
5,265,749  11/1993  Zutler ..................................... 220/4.24

FOREIGN PATENT DOCUMENTS

| 0341681 | 8/1904 | France | 379/439 |
| 2598874 | 11/1987 | France | 379/451 |
| 2668014 | 4/1992 | France | 379/451 |
| 1565056 | 3/1980 | United Kingdom | 379/452 |

*Primary Examiner*—Thomas P. Hilliard

[57] ABSTRACT

A cover for enclosing the communicating portions of a telephone handset. The inventive device includes a cover assembly positionable into an abutting relationship with the mouthpiece or earpiece of a handset. An engaging assembly extends from the cover assembly for circumferentially extending about the mouthpiece or earpiece and engaging a groove extending about the handset.

2 Claims, 3 Drawing Sheets

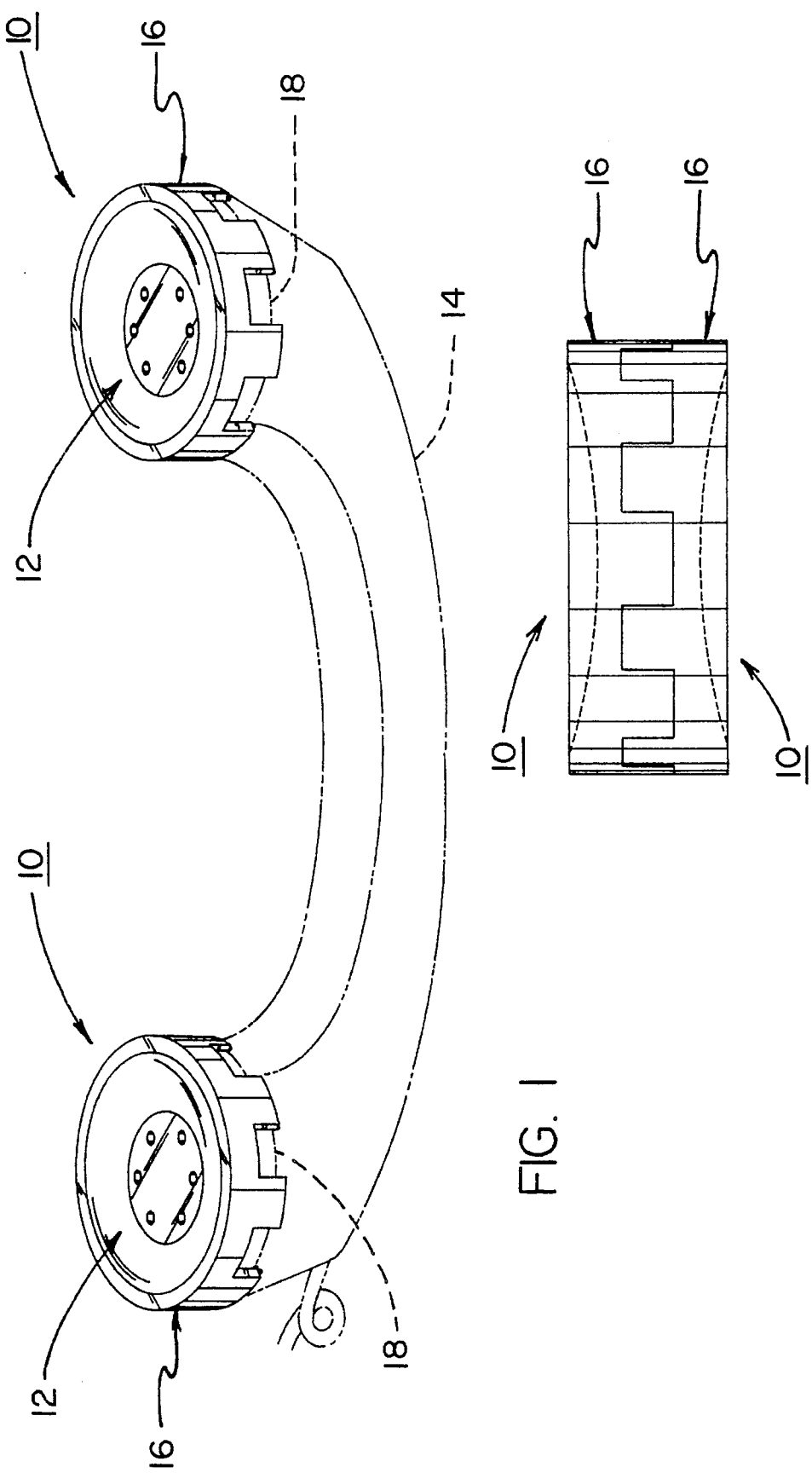

TELEPHONE HANDSET COVER

BACKGROUND OF THE INVENTION

1. Field of the Invention

The present invention relates to sanitary covering devices and more particularly pertains to an telephone handset cover for enclosing the communicating portions of a telephone handset.

2. Description of the Prior Art

The use of sanitary covering devices is known in the prior art. More specifically, sanitary covering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art sanitary covering devices include U.S. Pat. No. 4,570,038; U.S. Pat. No. 4,852,163; U.S. Pat. No. 4,953,703; U.S. Pat. No. 253,236; U.S. Pat. No. 291,306; U.S. Pat. 307,753; U.S. Pat. No. 329,241 and U.S. Pat No. 338,675.

While these devices fulfill their respective, particular objectives and requirements, the aforementioned patents do not disclose a telephone handset cover for enclosing the communicating portions of a telephone handset which includes a cover means positionable into an abutting relationship with the mouthpiece or earpiece of a handset, and an engaging means extending from the cover means for circumferentially extending about the mouthpiece or earpiece and engaging a groove extending about the handset to secure the device relative to the handset.

In these respects, the telephone handset cover according to the present invention substantially departs from the conventional concepts and designs of the prior art, and in so doing provides an apparatus primarily developed for the purpose of enclosing the communicating portions of a telephone handset.

SUMMARY OF THE INVENTION

In view of the foregoing disadvantages inherent in the known types of sanitary covering devices now present in the prior art, the present invention provides a new telephone handset cover construction wherein the same can be utilized for enclosing the communicating portions of a telephone handset. As such, the general purpose of the present invention, which will be described subsequently in greater detail, is to provide a new telephone handset cover apparatus and method which has many of the advantages of the sanitary covering devices mentioned heretofore and many novel features that result in a telephone handset cover which is not anticipated, rendered obvious, suggested, or even implied by any of the prior art sanitary covering devices, either alone or in any combination thereof.

To attain this, the present invention generally comprises a cover for enclosing the communicating portions of a telephone handset. The inventive device includes a cover assembly positionable into an abutting relationship with the mouthpiece or earpiece of a handset. An engaging assembly extends from the cover assembly for circumferentially extending about the mouthpiece or earpiece and engaging a groove extending about the handset.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone handset cover apparatus and method which has many of the advantages of the sanitary covering devices mentioned heretofore and many novel features that result in a telephone handset cover which is not anticipated, rendered obvious, suggested, or even implied by any of the prior art sanitary covering devices, either alone or in any combination thereof.

It is another object of the present invention to provide a new telephone handset cover which may be easily and efficiently manufactured and marketed.

It is a further object of the present invention to provide a new telephone handset cover which is of a durable and reliable construction.

An even further object of the present invention is to provide a new telephone handset cover which is susceptible of a low cost of manufacture with regard to both materials and labor, and which accordingly is then susceptible of low prices of sale to the consuming public, thereby making such telephone handset covers economically available to the buying public.

Still yet another object of the present invention is to provide a new telephone handset cover which provides in the apparatuses and methods of the prior art some of the advantages thereof, while simultaneously overcoming some of the disadvantages normally associated therewith.

Still another object of the present invention is to provide a new telephone handset cover for enclosing the communicating portions of a telephone handset.

Yet another object of the present invention is to provide a new telephone handset cover which includes a cover means positionable into an abutting relationship with the mouthpiece or earpiece of a handset, and an engaging means extending from the cover means for circumferentially extending about the mouthpiece or earpiece and engaging a groove extending about the handset to secure the device relative to the handset.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a pair of telephone handset covers according to the present invention in use.

FIG. 2 is an elevation view of a pair of the telephone handset covers coupled together in a storage position.

DESCRIPTION OF THE PREFERRED EMBODIMENT

Figure 3:
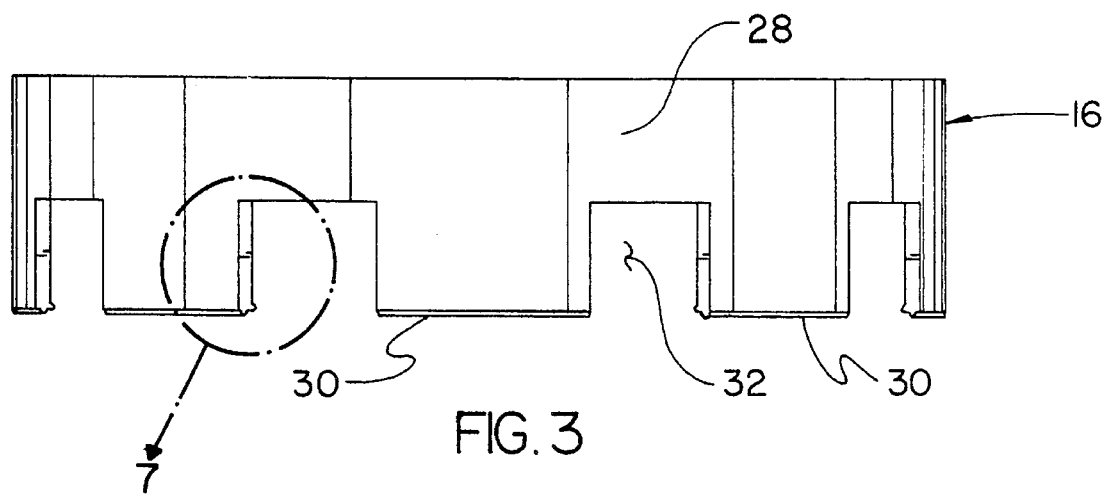
FIG. 3 is an elevation view of a single telephone handset cover.
Figure 4:
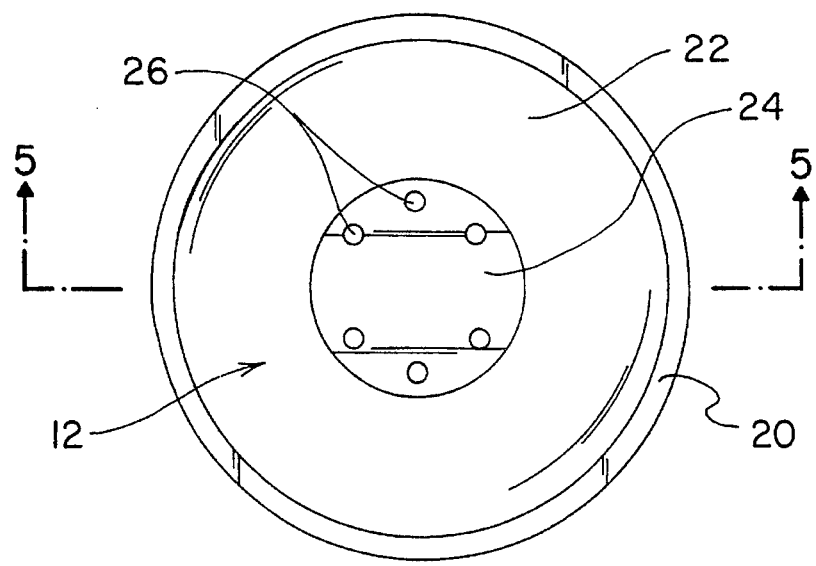
FIG. 4 is a top plan view thereof.
Figure 5:
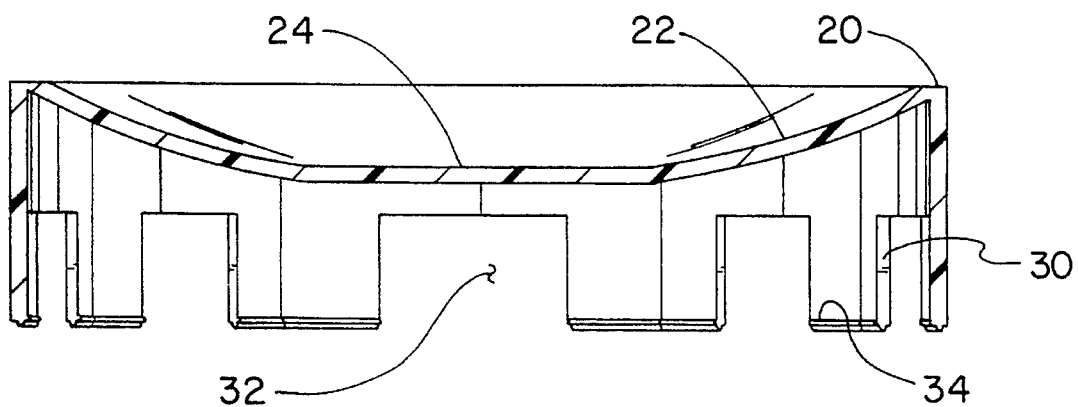
FIG. 5 is a cross sectional view taken along line 5—5 of FIG. 4.
Figure 6:
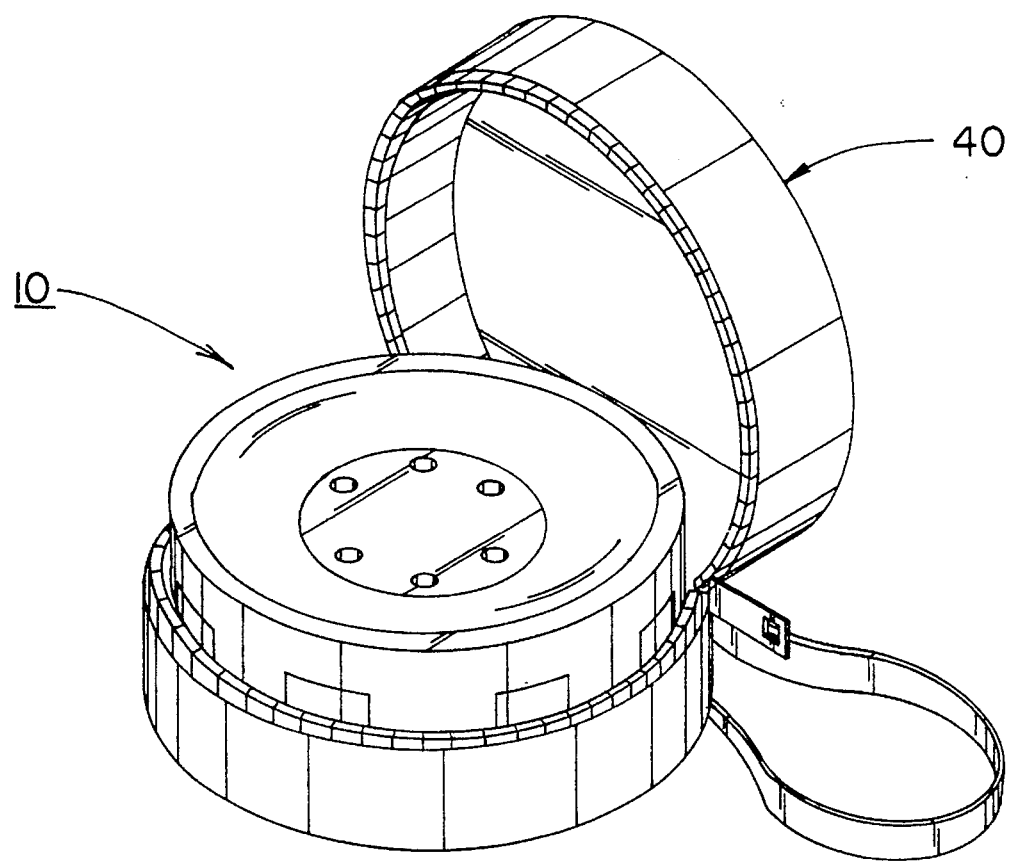
FIG. 6 is an isometric illustration of the invention including a storage case.

With reference now to the drawings, and in particular to FIGS. 1–7 thereof, a new telephone handset cover embodying the principles and concepts of the present invention and generally designated by the reference numeral 10 will be described.

More specifically, it will be noted that the telephone handset cover 10 comprises a cover means 12 for positioning over a communicating portion, such as an earpiece or a mouthpiece, of a telephone handset 14, as shown for both such communicating portions of the handset in FIG. 1 of the drawings. An engaging means 16 extends from the cover means 12 for circumferential positioning about the communicating portion of the handset 14 and for engaging a handset groove 18 of the handset to secure the cover means 12 relative thereto. As shown in FIG. 2, the engaging means 16 further operates to couple a pair of the telephone handset covers 10 together such that contaminated interior portions thereof are substantially encapsulated. By this structure, an individual can effect sanitary covering of the communicating portions of the telephone handset such as can be found with a public telephone or like structure.

Referring now to FIGS. 3 through 7 wherein the present invention is illustrated in detail, it can be shown that the cover means 12 according to the present invention preferably comprises an outer annular wall 20 having a diameter equal to or slightly greater than a diameter of the communicating portions of the handset 4 to which the device 10 is to be associated with. A truncated conical wall 22 extends radially inward from the outer annular wall 20 and terminates in an enlarged center aperture across which a center wall 24 extends to complete the cover means 12. A plurality of apertures 26 directed through the center wall 24 permits sound vibrations or waves to be directed through the telephone handset cover 10 to permit communication therethrough during use of the handset With continuing reference to FIGS. 3 through 7, it can be shown that the engaging means 16 according to the present invention 10 preferably comprises a depending cylindrical side wall 28 coupled to and extending from the outer annular wall 20 so as to be circumferentially extendable about the communicating portions of the handset 14 as shown in FIG. 1 of the drawings. A plurality of arcuate tabs 30 project axially from the depending cylindrical side wall 28 and can be integrally formed with the depending cylindrical side wall 28 by a plurality of cut-outs 32 directed thereinto. As shown in the cross sectional illustration of FIG. 5, the arcuate tabs 30 project substantially colinearly from the depending cylindrical side wall 28 and each terminate in a lower distal end whereat an arcuate radial projection 34 is mounted along an interior surface. The arcuate radial projection 34 projects radially inward towards a center of the depending cylindrical side wall 28 and operates to engage a handset groove 18 extending about the communicating portion of a handset 14 to which the device 10 is to be associated. By this structure, the engaging means 16 can be easily snapped into engagement with the handset groove 18 of the handset 14 so as to retain the device relative thereto.

Figure 7:
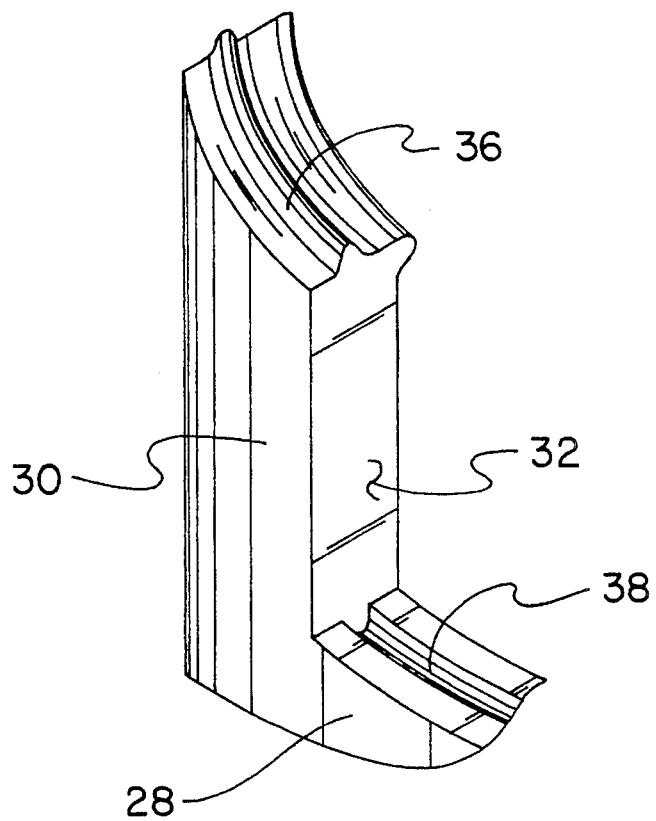
FIG. 7 is an enlarged inverted isometric illustration of the area set forth in FIG. 3.

Preferably, the arcuate tabs 30 are of an arcuate length substantially equal to an arcuate length of the cutouts 32 such that the engaging means 16 of a pair of the telephone handset covers 10 can be cooperatively engaged as shown in FIG. 2 of the drawings. To facilitate retention of such positioning of a pair of the telephone handset covers 10, it is desirable for each of the arcuate tabs 30 to further include an arcuate axial projection 36 extending from the lower distal end thereof as shown in FIG. 7 of the drawings. The depending cylindrical side wall 28 within each of the cutouts 32 is thus shaped so as to define an arcuate axial groove 38 shaped for cooperative reception of the arcuate axial projection 36 when a pair of the telephone handset covers 10 is coupled together. If desired, a storage case 40 can be provided with the present invention 10 for storing new or contaminated covers 10 therewithin.

In use, the telephone handset cover 10 according to the present invention can be easily utilized to effect sanitary covering of the communicating portions of a telephone handset 14. The present invention 10 serves to substantially reduce or eliminate a risk or transmitting germs through repeated public use of such telephone handsets 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephone handset cover comprising;

a cover means for positioning over a communication portion of a telephone handset, said cover means comprising an outer annular wall; a truncated conical wall extending radially outward from the outer annular wall and terminating in an enlarged center aperture; a center wall extending across the center aperture of the conical wall, the center wall being shaped so as to define a plurality of apertures directed therethrough;

an engaging means extending from the cover means for engaging a handset groove of the handset to secure the cover means relative thereto, said engaging means having a depending cylindrical side wall coupled to and extending from said outer annular wall so as to be circumferentially extendable about a communicating portion of said handset; a plurality of arcuate tabs projecting from the depending cylindrical side wall, the arcuate tabs projecting substantially colinearly from said side wall and each terminating in a lower distal end whereat an arcuate radial projection is mounted along an interior surface, the arcuate radial projection extending radially inwards towards a center of said depending side wall and being adapted to engage a handset groove extending about a communication portion of a handset, said arcuate tabs being each defined by a plurality of cut-outs directed into said cylindrical side wall, said tabs being each of an arcuate length substantially equal to an arcuate length of the cut-outs so that the engaging means of a pair of the telephone handset covers can be cooperatively engaged to couple the pair of the telephone handset covers together such that contaminated interior portions thereof are substantially encapsulated, said arcuate tabs each further including an arcuate axial projection extending from a lower distal end thereof; and further wherein the depending cylindrical side wall within each of the cut-outs is shaped so as to define an arcuate axial groove shaped for cooperative reception of an arcuate axial projection of one of the arcuate tabs when a pair of the telephone handset covers is coupled together.

2. A telephone handset cover in combination with a storage case, the combination comprising;

a cover means for positioning over a communication portion of a telephone handset, said cover means comprising an outer annular wall; a truncated conical wall extending radially outward from the outer annular wall and terminating in an enlarged center aperture; a center wall extending across the center aperture of the conical wall, the center wall being shaped so as to define a plurality of apertures directed therethrough;

an engaging means extending from the cover means for engaging a handset groove of the handset to secure the cover means relative thereto, said engaging means having a depending cylindrical side wall coupled to and extending from said outer annular wall so as to be circumferentially extendable about a communicating portion of said handset; a plurality of arcuate tabs projecting from the depending cylindrical side wall, the arcuate tabs projecting substantially colinearly from said side wall and each terminating in a lower distal end whereat an arcuate radial projection is mounted along an interior surface, the arcuate radial projection extending radially inwards towards a center of said depending side wall and being adapted to engage a handset groove extending about a communication portion of a handset, said arcuate tabs being each defined by a plurality of cut-outs directed into said cylindrical side wall, said tabs being each of an arcuate length substantially equal to an arcuate length of the cut-outs so that the engaging means of a pair of the telephone handset covers can be cooperatively engaged to couple the pair of the telephone handset covers together such that contaminated interior portions thereof are substantially encapsulated, said arcuate tabs each further including an arcuate axial projection extending from a lower distal end thereof; and further wherein the depending cylindrical side wall within each of the cut-outs is shaped so as to define an arcuate axial groove shaped for cooperative reception of an arcuate axial projection of one of the arcuate tabs when a pair of the telephone handset covers is coupled together, a storage case for storing at least one cover therewithin.

\* \* \* \* \*